ically. In one example method, a query associated

United States Patent
Pais et al.

(10) Patent No.: US 11,481,642 B2
(45) Date of Patent: Oct. 25, 2022

(54) PROFESSIONAL SERVICES DEMAND FULFILLMENT FRAMEWORK USING MACHINE LEARNING

(71) Applicant: SAP SE, Walldorf (DE)

(72) Inventors: Melvi Pais, Heidelberg (DE); Shruthi Amblur Ramesh Babu, Heidelberg (DE)

(73) Assignee: SAP SE, Walldorf (DE)

( * ) Notice: Subject to any disclaimer, the term of this patent is extended or adjusted under 35 U.S.C. 154(b) by 814 days.

(21) Appl. No.: 16/429,574

(22) Filed: Jun. 3, 2019

(65) Prior Publication Data

US 2019/0370669 A1 Dec. 5, 2019

Related U.S. Application Data

(60) Provisional application No. 62/680,197, filed on Jun. 4, 2018.

(51) Int. Cl.
*G06F 16/903* (2019.01)
*G06F 16/9032* (2019.01)
(Continued)

(52) U.S. Cl.
CPC ......... *G06N 5/02* (2013.01); *G06F 16/90332* (2019.01); *G06F 16/90335* (2019.01);
(Continued)

(58) Field of Classification Search
CPC .......... G06N 5/02; G06N 20/00; G06N 5/022; G06F 16/90332; G06F 16/90335; G06F 40/30; G06V 10/751; G06Q 10/105
See application file for complete search history.

(56) References Cited

U.S. PATENT DOCUMENTS 7,765,166 B2 * 7/2010 Beringer ............ G06Q 10/0633
  705/319
9,336,302 B1 * 5/2016 Swamy ............... G06F 16/3326
  (Continued)

OTHER PUBLICATIONS

Youtube.com [online], "A.I. Experiments: Visualizing High-Dimensional Space," posted by: Google Developers, published on: Nov. 15, 2016, [retrieved on Jun. 5, 2019], retrieved from: URL<https://www.youtube.com/watch?v=wvsE8jm1GzE>, 4 pages, (video submission with transcript).

*Primary Examiner* — Jorge A Casanova
(74) *Attorney, Agent, or Firm* — Fish & Richardson P.C.

(57) ABSTRACT

Techniques are described for fulfilling resources demand dynamically. In one example method, a query associated with a request of a demand fulfillment analysis associated with an identification of a plurality of potential persons related to a demand is received. The received query is analyzed to determine an intent of the demand. Based on the determined intent of the demand, algorithms to be applied to an underlying data set are identified, where the underlying data set comprises a collected set of information from a plurality of source systems. The identified algorithms are applied to the underlying data set based on a set of parameters associated with the received query to generate an updated data set from the underlying data set. The updated data set is then clustered to generate a result set from the underlying data set, and a visualization of the result set is generated for presentation.

20 Claims, 6 Drawing Sheets

(51) Int. Cl.
*G06F 40/30* (2020.01)
*G06N 20/00* (2019.01)
*G06N 5/02* (2006.01)
*G06V 10/75* (2022.01)

(52) U.S. Cl.
CPC ............ *G06F 40/30* (2020.01); *G06N 20/00* (2019.01); *G06V 10/751* (2022.01)

(56) References Cited

U.S. PATENT DOCUMENTS

| | | | |
|---|---|---|---|
| 9,990,599 B1* | 6/2018 | Kannan | G06Q 10/06398 |
| 2007/0206086 A1* | 9/2007 | Baron | H04N 7/147 |
| | | | 348/E7.081 |
| 2009/0276297 A1* | 11/2009 | Ehrler | G06Q 10/00 |
| | | | 705/7.42 |
| 2012/0054142 A1* | 3/2012 | Du | G06N 5/02 |
| | | | 706/47 |
| 2012/0150859 A1* | 6/2012 | Hu | G06Q 10/00 |
| | | | 707/E17.089 |
| 2013/0159926 A1* | 6/2013 | Vainer | G06F 16/00 |
| | | | 715/804 |
| 2013/0293551 A1* | 11/2013 | Erez | G06T 11/206 |
| | | | 345/440 |
| 2019/0164016 A1* | 5/2019 | Allen | G06N 20/00 |
| 2019/0236613 A1* | 8/2019 | Dinh | G06F 16/3347 |
| 2020/0134541 A1* | 4/2020 | Ebner | G06N 20/00 |
| 2020/0302364 A1* | 9/2020 | Singh | G06N 20/00 |
| 2021/0224488 A1* | 7/2021 | Arya | G06Q 30/0201 |

* cited by examiner

FIG. 4: High-Level Analysis

FIG. 5: Example Result Set

FIG. 6: Example Result Set with Hover Over

PROFESSIONAL SERVICES DEMAND FULFILLMENT FRAMEWORK USING MACHINE LEARNING

CLAIM OF PRIORITY

This application claims priority under 35 USC § 119(e) to U.S. Provisional Patent Application Ser. No. 62/680,197, filed on Jun. 4, 2018, entitled "Professional Services Demand Fulfillment Framework Using Machine Learning", the entire contents of which are hereby incorporated by reference.

TECHNICAL FIELD

The present disclosure relates to computer-implemented methods, software, and systems for fulfilling resources demand dynamically based on a generated dynamic map.

BACKGROUND

Employees in knowledge-based companies (e.g., a professional services firm) have a strategic asset in knowledge workers (e.g., employees and contractors) responsible for performing complex, multidimensional, and interdependent tasks. A worker's knowledge may come from long-term experience that is complimented with regular training on the latest trends and/or technologies. Knowledge workers follow good practices, such as sharing their knowledge with teammates as well as being proactive, flexible and adaptable to achieve, for example, corporate social and economic objectives of their projects. Knowledge workers act as catalysts in their respective industry, and are a determining factor of the performance, productivity and quality of work delivered by the project as thus the organization overall.

SUMMARY

The present disclosure involves systems, software, and computer-implemented methods for dynamically generating resource demand fulfillment visualizations. In one example implementation, a computerized method executed by hardware processors can be performed. The example method can include receiving a query associated with a request of a demand fulfillment analysis associated with an identification of a plurality of potential persons related to a demand, and analyzing the received query to determine an intent of the demand. Based on the determined intent of the demand, identifying at least one algorithm to be applied to an underlying data set, the underlying data set comprising a collected set of information from a plurality of source systems, the collected set of information identifying employment-related details associated with a plurality of persons. The at least one identified algorithm is applied to the underlying data set based on a set of parameters associated with the received query to generate an updated data set from the underlying data set, and at least one clustering algorithm is performed on the updated data set to generate a result set from the underlying data set. A visualization of the result set is generated for presentation, and the generated visualization can be provided for presentation.

Implementations can optionally include one or more of the following features. In some instances, the plurality of source systems can include at least one system internal to an enterprise providing the demand fulfillment analysis, and at least one system external to the enterprise providing the demand fulfillment analysis. In some instances, the at least one system internal to the enterprise providing the demand fulfillment analysis can include at least one of an employee management system, an internal project systems, a human resource application, an internal publishing system, or a contractor management systems. In some instances, the at least one system external to the enterprise providing the demand fulfillment analysis can include at least one of a professional networking site, an external publishing database, or a third-party job application site.

In some instances, the received query comprises a natural language query, and analyzing the received query to determine the intent of the demand can comprise performing a semantic analysis of the natural language query to determine the intent of the demand. In some of those instances, identifying the at least one algorithm to be applied to an underlying data set comprises matching the determined intent of the demand to a predefined set of algorithms to be applied to the underlying data set, wherein predefined sets of algorithms are associated with particular intents of received queries. In some of those instances, the predefined set of algorithms can comprise two or more algorithms to be applied to the underlying data set based on the received query, where the two or more algorithms to be applied are associated with a particular order of application of the algorithms.

In some instances, applying the at least one identified algorithm to the underlying data set based on a set of parameters associated with the received query to generate an updated data set from the underlying data set can comprise applying the at least one identified algorithm to a copy of the underlying data set at a data staging area, wherein applying the at least one identified algorithm to the underlying data set does not modify the underlying data set.

In some instances, clustering the updated data set to generate a result set from the underlying data set comprises generating a three-dimensional cloud of persons from the underlying data set, the cloud of persons organized based on their relationship to the received query. In those instances, generating a visualization of the result set for presentation can comprise generating, from the three-dimensional cloud of persons, a two-dimensional visualization of the three-dimensional cloud of persons.

In some of those instances, generating, from the three-dimensional cloud of persons, the two-dimensional visualization of the three-dimensional cloud of persons can comprise identifying at least one relationship between persons included in the two-dimensional visualization, and annotating the two-dimensional visualization with at least one of the identified relationships between persons included in the two-dimensional visualization. In some other instances, generating, from the three-dimensional cloud of persons, the two-dimensional visualization of the three-dimensional cloud of persons can comprise identifying information associated with particular persons included in the two-dimensional visualization related to at least one of their respective role or availability, and annotating the two-dimensional visualization with at least a portion of the identified information for at least one of the particular persons in the two-dimensional visualization. In some of those instances, annotating the two-dimensional visualization with at least a portion of the identified information for at least one of the particular persons in the two-dimensional visualization can comprise adding an interactive link to an illustration associated with a particular person, where the interactive link provides a link to information associated with the particular person in at least one source system from which data was collected for the particular person.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

A key point for the survival of enterprises and entities in innovative and knowledge industries is having knowledge shared effectively, with facts in the right place at the right time, and the ability to enable identification of the right topics to address at the right time. Because of this, a way to identify the right resources to be part of centers of excellence (COEs), and in some cases, a gamification of a skill-based approach, to encourage people to leverage COE is needed, allowing users to reach deep into institutional knowledge and data to find team members, employees, contractors, and other available persons that fit a task at hand in a smart and analytical manner.

Existing systems may not include an efficient way to allocate resources. For example, enterprises invest heavily on periodic networking meetings—a process that is not very efficient and includes planning on the part of the workers. Additionally, enterprises tend to define internal COEs based on qualitative feedback. COEs may also be a fixed organization that is statically defined without taking into account the members availability, as well as the true ability for particular persons inside or external to those COEs that could be of assistance in furthering the goals of the business. When such COEs are static, the available resources for an entity may not be readily identified, and may not be used in a more optimal manner when a simple presentation of data is needed. Furthermore, traditional scoring models and evaluations of potential team members are based on few parameters, such as proficiency in matching skills and years of experience.

A demand or a role by nature is dynamic, while a COE can be static. By generating and employing a dynamic map of resources (e.g., workers), various aspects of the role data points can be miner, anaylzed, and solution implemented. A dynamic map may also be employed to determine value adding applications, which may focus on, for example, tangible (e.g., open staffing) and non-tangible (e.g., resource skills) revenue losses.

In some implementations, a dynamic map of resources may include nodes or groupings for an internal supply or resources, which may be referenced to as the "bench," an external supply of resources, which may be referred to as the "virtual bench," and a project internal demand, which can include staffed workers as well as additional staffing opportunities. Additional staffing opportunities may include lost revenue. A dynamic map includes parameters that happen on the role or requirement; however, these parameters are a changing dataset that may be groomed over a period of time by discussion interviews and better understanding of project needs. Additionally, a unified event processing framework can be employed to exchange events in existing systems with external systems. The event processing framework can provide, for example, a publish-subscribe messaging approach in which events are exchanged as a message. Such a message may include, for example, a payload and a topic. A topic syntax can also be introduced that is well-defined, follows a path-based approach, and allows a translation into different protocol-specific formats (e.g., Advanced Message Queuing Protocol (AMQP), Message Queuing Telemetry Transport (MQTT)). Events can be described by structures known to the existing system, which can allow for extraction of metadata and schema information in different formats (e.g., JavaScript Object Notation (JSON) Schema).

In some implementations, a dynamic map can be generated evaluating a group of works on particular skills or topics (e.g., skills necessary for a particular project). Workers may be categorized as leaders and/or experts on each of the topics, while other workers are categorized as mediocre or learners for each of the topics. These parameters (e.g., skills, experience, and so forth) are extended to n-dimensions and numerical values are assigned to text or numerical inputs to, for example, group a particular category of individuals.

In some implementations, a t-Distributed Stochastic Neighbor Embedding (TSNE) machine learning algorithm or model is applied to determine to dynamic map based on these categorizations and parameters. For example, a machine learning model can be trained to map, graph, and analyze high-dimensional work data based on multiple parameters associated with the worker in an n-dimensional space. Workers may be represented by points in a data set in the n-dimensional space. These points may be then projected in the n-dimensional space onto a lower-dimensional map. The lower-dimensional map can then be analyzing to determine the features of interest and to create the dynamic map based on defined roles and/or selection criteria.

In some implementations, to generate a dynamic map, entry scores can be defined for a COE. Based on trained machine learning algorithms that run against all workers, scores are calculated and compared to a virtual COE. Furthermore, regression can be applied to determine a network ranking and/or score. Two points are neighbors in high dimension, they can be declared neighbors in two dimensions (2D) or three dimension (3D) so as to group similar worker.

Once determined, a dynamic map of workers can be employed to select dynamic and in-demand resources from a virtual network, which can be employed in retention, recruitment, and/or training plans. Furthermore, the dynamic map can be employed to determine long term open positions, to determine niche roles where each niche skill is mapped to an expected skill bundle and/or proficiency. The skill levels of staffed workers can be checked on the fly and staffed virtually under a role-based COE. Additionally, candidates can be identified from the virtual bench to fill particular project roles.

In the present solution, particular persons included in an analysis can include a variety of individuals, both internal to and external from the particular enterprise or entity managing the analysis and analytical system. Internal users associated with an internal bench includes current full-time and part-time employees. Those internal users may be associated with various skill sets, expertise (based on their historical assignments, evaluations, and feedback, etc.), and availability, among other information. Some of the internal users may be determined to be currently staffed on one or more projects or positions, while other internal users may not be currently staffed on projects, or may be near a completion point on projects where availability is upcoming. External users can include contract workers, such as consultants, as well as workers or individuals who are not directly employed by or connected to the enterprise. This may be identified based on searches of job-based websites or databases, such as LinkedIn for example, as well as other contracting and job-seeking databases and entities. In determining the need for a current position or internal demand, the solution described herein can provide a collected source of many potential persons from various databases, and can evaluate those persons based on their expertise and availability. To determine who fits a requested need, one or more trained machine learning algorithms may be applied and evaluated to narrow the potential persons into a proposed set of possible persons who best meet the requested need. A visualization of those persons can then be presented to a requesting user or system, which can, in some instances, further annotate the visualization to best identify the persons and their relationship to the requester and to each other, as well as provide additional information about those persons current and future availability.

In some instances, the present solution collects data from a plurality of distributed landscapes and cannot be realised with one application or platform, as collecting and synthesizing data requires significant complexity and manipulation. Instead, the present solution provides an end-to-end data orchestration platform which can handle data transformation, data profiling, text analytics, and event stream integration. The collected data can be ingested into a series of machine learning algorithms via a staged process to acheive the end result and presentation. Further, depending on the particular intent or basis for a request into the system, a different or particular set of machine learning algoritms can be applied to generate a particular result set, where those applied machine learning algorithms are specific to the particular intent of the incoming request. The analyses provided can be modified in a manner to allow a specific request's intent and input to govern and modify the response received through the analytical system.

Example intents or bases for queries can include one or more of the following. First, a set of staffing priorities could be generated by analyzing current employees, current and available contract workers, and potential team members that may be outside of current employees and contract workers identified via other external systems, including social networks and other data sources.

A second use of the techniques described herein can identify potential escalation channels on project pain points—for issues seen during operations or during a project, a query can be submitted to identify the experts that can assist with that particular issue. Using the advanced query analysis, internal experts and potentially external experts can be identified and presented to the requesting user or team, allowing an immediate illustration of persons who can be of assistance to solve the experienced issue.

In some instances, a network for new joinees (e.g., new employees and/or new contractors) can be generated when the new joinee arrives. For example, a new contractor for a particular project can obtain, through a single query, a result list and illustration of a set of other contractors and employees with similar experience and/or expertise, allowing for easy onboarding and peer or mentor identification.

In another implementation, a particular in-demand topic or resource can be identified and used as the basis for the query. Based on that analysis, both internal and external persons can be evaluated to determine which persons have or are associated with those skills, as well as additional training and/or recruitment that may be needed for further bolstering of skills in that area for the enterprise. Similarly, niche technology familiarity and expertise can be determined using a query, wherein niche skills and expertise can be evaluated according to one or more algorithms and a search of databases corresponding to available and potentially available persons. The skill levels of available staffing can be analyzed, and if additional needs are determined, then additional candidates can be identified.

In some instances, the present solution can be used in combination with budgeting and management applications to identify a best combination of employees to contract staff and/or hiring based on an expertise and costs analysis. For example, a set of persons may be identified as having skills associated with the requested query. As part of the information about those persons, information about pay scales, required compensation, and consulting costs, in addition to availability information, can be combined and used to evaluate the most cost-effective solution. Example parameters for the analysis may also include a set of travel-related costs for employees in other locations, the costs associated with staffing using a contract employee, and/or identifying and hiring outside talent.

In some implementations, the solution can be used to identify the right persons within an organization who should meet with or be provided networking opportunities with particular candidates and/or existing employees. Using this analysis, networking event participation can be evaluated to ensure that experts in related fields can meet and create introductions, and that potential candidates can be evaluated by employees and managers who have an understanding of the candidate's expertise and experience.

In another implementation, the expertise and experience levels of those available persons can be evaluated as to a particular geographic area using filters and particular query limits. In doing so, efficiency can be provided to ensure that persons in a geographic area or a particular same time zone can be matched to issues or problems more efficiently, thereby allowing real-time answers and assistance to be provided.

Generally, the solutions provided herein allow for the collection of data from multiple internal and external sources, where that data provides information on a plurality of persons both internal to an organization or enterprise (e.g., employees, current contractors, etc.) and external (e.g., available but not used contractors, candidates, external experts). A library of machine learning algorithms are trained over time and made available to be used to evaluate the collected data based on a specific intent or purpose of a received query. The query can be provided through a conversational interface, a standard web-based application or web browser, or a dedicated application related to the data collection and analysis system, and used to query and filter through the collected data by applying one or more of the machine learning algorithms to the data set. A staging area can be used to manipulate the initial data set down to a filtered data set using a series of the machine learning algorithms corresponding to the intent of the query, and a result set can be determined once the results are available. In some instances, one or more clustering techniques can be used to further classify and identify a particular result set to a query from the data set. Using advanced statistical analyses, a result set can be determined and a corresponding visualization can be generated. The visualization can be generated as a two-dimensional (2D) visualization showing connections from the query or intent of the query to the network of persons representing the result set. Further, the visualization can be updated to include one or more annotations providing additional information about those persons in the result set. In some instances, employees, contractors, and external persons may be color-coded or otherwise presented for immediate identification of the particular status of the members of the result set. Further, persons who are currently available (e.g., not fully committed to projects, awaiting assignment, etc.) may be additionally color-coded or otherwise presented within the visualization. Further, edges between members of the result set may be used to identify additional information and/or relationships between those members, such as competitors, experience working together, supervisory or organization relationships, particular roles, and other information. Still further, by hovering over or selecting a particular entry, additional information not immediately presented may be provided, such as contact information, detailed status information, and/or links to additional information.

Figure 1:
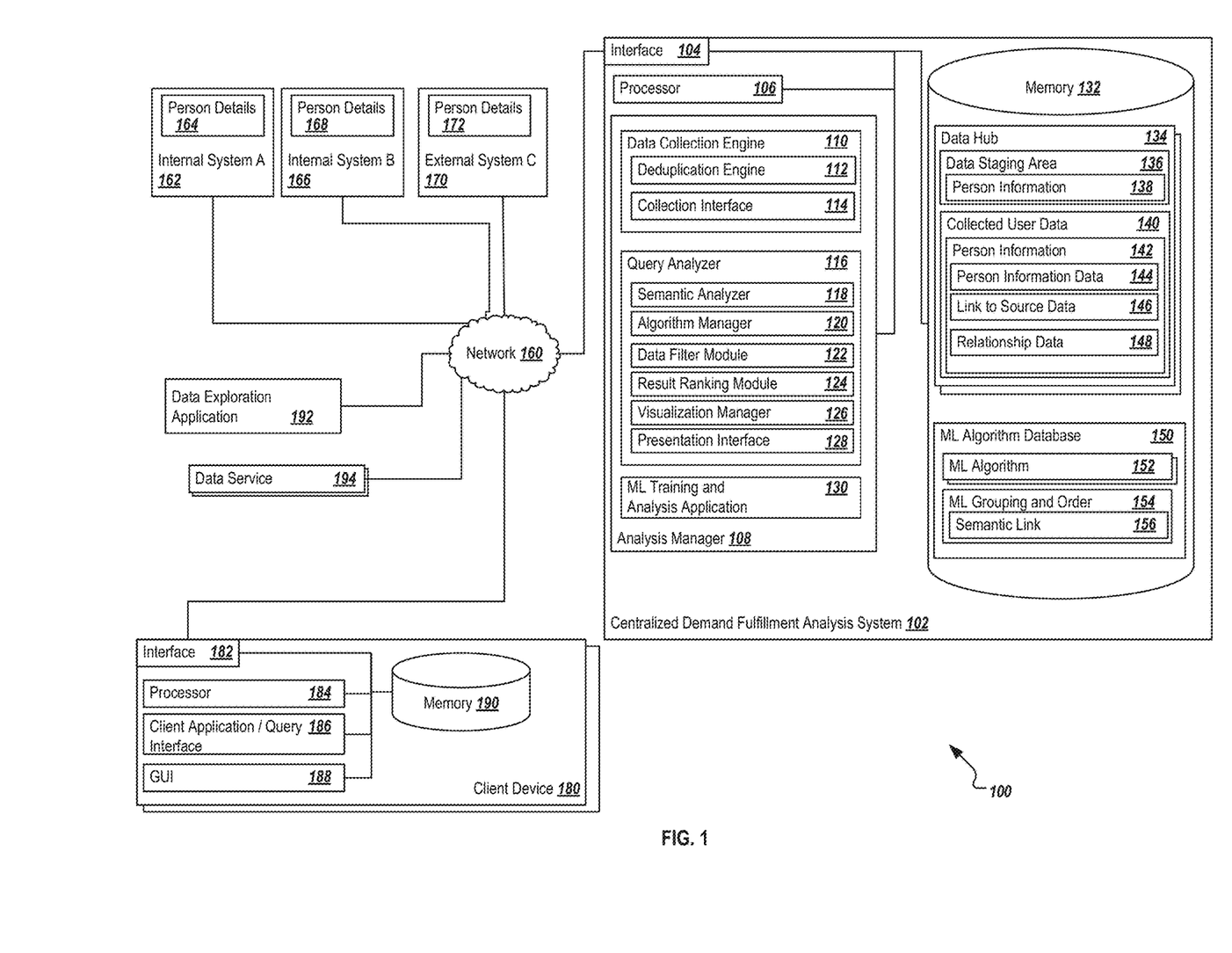
FIG. 1 is a block diagram illustrating an example system for implementing the dynamic fulfillment of resource demand.

Turning to the illustrated implementation, FIG. 1 is a block diagram illustrating an example system 100 for implementing the dynamic fulfillment of resource demand. As illustrated in FIG. 1, system 100 is associated with a system for collecting personal expertise and experience data from a plurality of data sources and allowing the illustrated system to use that information to evaluate demand fulfillment-related queries and prepare responsive visualizations. System 100 includes, as illustrated, a centralized demand fulfillment analysis system 102, a plurality of internal and external systems 162, 166, 170, from which personnel information can be obtained by a data collection engine 110 of the system 102, a client device 180, a data exploration application 192, and one or more data services 194, each communicably connected to each other via network 160. In some instances, queries to the demand fulfillment analysis system 102 can be received from client device 180 (e.g., via a client application and/or query interface 186, which may include a conversational UI or intelligent virtual assistant), as well as from a data exploration application 192 or one or more data services 194. In some instances, at least some or all of the components may be cloud-based components or solutions, while in others, non-cloud systems may be used. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, centralized demand fulfillment analysis system 102 and client 180 may be any computer or processing device such as, for example, a blade server, general-purpose personal computer (PC), Mac®, workstation, UNIX-based workstation, or any other suitable device. Moreover, although FIG. 1 illustrates a single centralized demand fulfillment analysis system 102, the system 102 can be implemented using a single system or more than those illustrated, as well as computers other than servers, including a server pool. In other words, the present disclosure contemplates computers other than general purpose computers, as well as computers without conventional operating systems. Similarly, the client 180 may be any system which can request data and/or interact with the analysis system 102. The client 180, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the analysis system 102 may be associated with the execution of an analysis manager 108, which can perform operations associated with both data collection (via illustrated data collection engine 110) and query analysis and execution (via illustrated query analyzer 116). In some instances, the analysis manager 108 may also perform or be associated with a machine learning training and analysis application 130, where one or more machine learning algorithms 152 are trained, and analyses and updates performed to identify how particular sets of algorithms 152 should be applied based on the received queries. In some instances, the analysis system 102 may be associated with an end-to-end business solution system, enterprise resource planning (ERP) systems, customer resource management (CRM) systems, business intelligence systems, cloud platform systems, supplier management (SM) systems, or any other suitable system, including non-business-related systems.

In general, the analysis system 102 executes one or more applications and modules related to the underlying operations of the analysis system 102, through which information about particular employees and other workers can be collected, analyzed, and used to respond to demand-related queries from one of a plurality of systems (e.g., client device 180, data exploration application 192, and data service 194, as examples). To perform these operations, a set of collected user data 140 is collected from a plurality of sources, both internal and external, from which personnel information can be obtained, and can be stored within a data hub 134 of memory 132. The data hub 134 provides a location for the collected user data 140, as well as a data staging area 136 where results associated with particular queries can be managed, modified, and reviewed.

Examples of the data sources from which personnel information can be obtained includes, but is not limited to, internal systems including employee management systems, internal project systems (e.g., to identify current project assignments), human resource applications (e.g., to identify skills and training), internal publishing systems (e.g., to identify materials published by particular users), procurement systems (e.g., to obtain data re personnel management roles), travel- and reimbursement-based systems, customer support systems, contractor management systems, and others. Further, external systems can include third-party recruiting systems, professional networking sites, publishing databases, industry websites and user databases, and other information from which personnel information can be obtained.

Using the data collection engine 110, the analysis manager 108 and the analysis system 102 can interact with any number of systems from which personnel information can be obtained. Because information can be obtained from a distributed landscape of systems, varying depths of information can be captured about various persons and their professional interests, experience, expertise, and performance. In some instances, the data collection engine 110 can actively access or request information from the various systems 162, 166, 170, while in other instances, one or more of those systems can push or provide information to the data collection engine 110. In some instances, an agent or module of the data collection engine 110 can be installed at or have access to those systems 162, 166, 170, and can provide the information, while in other instances those systems may use their inherent capabilities (or that of another component) to push or provide the information to the data collection engine 110. Collection may be performed by or through a collection interface 114, which can allow information to be ingested by the analysis system 102 and stored within the collected user data 140. As illustrated, a deduplication engine 112 can be used to ensure that duplicative and other unnecessary or irrelevant information is removed from the collected user data 140, such as where information from multiple systems provides the same information. The data collection engine 110 may also include or perform relationship analysis between received data to combine and/or separate information as it is received and associate that data with the correct persons. For example, information from a first system and a second system may both be associated with a particular person—when storing that information, the data collection engine 110 can perform operations and analysis to determine a more current set of information where information conflicts, as well as to synthesize related and/or updated information with existing data.

As illustrated, the collected user data 140 includes person information 142 for each person for which information has been collected, where the person information for a particular person represents a combined set of information from the plurality of sources which has been gathered. As described, the data collection engine 110 may perform a deduplication action and other initial data clean up as data is received, or information may be initially stored and then analyzed to determine some data which can be removed for a particular user. In some instances, information collected in a set of person information 142 can include a link or identifier of the source data 146, which can include the particular system from which data was obtained. In doing so, additional data located at the source system but not collected by the data collection engine 110 may be accessible for future review and analysis, including in response to interactions with later visualizations of result sets. In some instances, the person information 142 can also include a set of relationship data 148, which may include a person's particular role, organization information, and other data that relates to one or more other persons or groups of persons. That information may include particular teams the person is associated with or on, managers or subordinates of the person, as well as other relevant information about the person's relationship to one or more other persons. In some instances, the link to the source data 146 can provide additional information about particular relationship data 148.

As illustrated, the analysis manager 108 includes the query analyzer 116. The query analyzer 116, as illustrated, includes a variety of components and modules, which may be combined or further separated in different implementations, or may be a part of the inherent functionality of the analysis manager 108 or any other suitable component or system in other implementations. As illustrated, the query analyzer 116 includes a semantic analyzer 118, an algorithm manager 120, a data filter module 122, a result ranking module 124, a visualization manager 126, and a presentation interface 128. Each component can perform particular operations of the query analyzer 116 and the analysis manager 108.

The semantic analyzer 118 can be used to understand an intent or application associated with a particular query received by the analysis manager 108. For example, natural language processing may be performed on a question to parse the received query and determine a particular intent of the received interaction, such as identifying new members of a team related to a particular type of software, identifying experts related to a particular system or functionality, or any of the potential demands or requirements that the requesting user or system may have. In other instances, the semantic analyzer 118 may use key words or specifically selected input fields to determine the particular intent of a query. In some instances, information about the requestor providing the query can be used, at least in part, to determine the intent of the particular query.

Based on the particular intent, an algorithm manager 120 can be used to determine the particular ML algorithms 152 to be applied to the set of persons from the collected user data 140. The intent or purpose of the query can be associated with one or more ML algorithms 152, based on a semantic link 156 between the query's intent and one or more of the algorithms 152. As illustrated, different grouping and orders of applications 154 of particular sets of ML algorithms 152 may be linked to different semantic intents, or to particular applications of the demand fulfillment analysis. For example, a particular set of ML algorithms 152 may be applied when a user searches for a new employee or team member, while another set of ML algorithms 152 are applied when a user searches for problem or issue escalation support. Additionally, the number and order of the particular ML algorithms 152 to be applied may differ based on the query, such as which user or system has initiated the query, as well as other information about the requesting person or reason for the demand. For example, if the demand is for an immediate answer to assist with an issue, then a particular set of algorithms 152 may be applied that consider the current time zone of the requesting user, as well as physical distance and availability. If the demand is for general assistance without particular urgency, the particular set of algorithms 152 may not be limited in location or time zone, and may be considered for a broader set of potential persons.

Once the particular algorithms to be applied are determined, a data filter module 122 can be used to apply the algorithms and begin to identify a responsive data set. The data filter module 122, using the determined algorithms 152, can use the data staging area 136 of the data hub 134 to manipulate and interact with the original data set and develop the result set for the particular query. Using the determined set of ML algorithms 152 and applying them in a particular order associated with the semantic intent of the query, a specific set of person information 138 corresponding to the query can be generated and updated.

Using the result set in the data staging area 136, a result ranking module 124 can be used to evaluate the result set to identify and rank particular persons from the result set to be presented to the querying user or system. The result ranking module 124 can use any suitable ranking technique, including but not limited to, applying relevance and ranking patterns such as classification algorithms including XGBoost and clustering algorithms such as K-means and/or Gaussian mixture models. In some instances, each result in the result set may be associated with a particular relevance factor or score, which can be used to identify a more relevant set of persons from the result set. In some instances, the result ranking module 124 may start with a three-dimensional (3D) person cloud representing the original set of all persons, which can then be filtered into a 3D filtered person cloud using the ML algorithms 152 to be applied and the query parameters. Using the ranking algorithms, and an analysis of the filtered person cloud, a 2D illustration of a set of persons can be presented, where the 2D illustration provides a clear feedback and connection to the intent and basis for the query. The result ranking module 124 can interact with the visualization manager 126 to generate the end visualizations based on the ranked result list, which can be used to provide output to users and other applications. The visualization manager 126 can further identify and insert annotations providing additional clarifying information about particular persons into the result set visualization. Further, the visualization manager 126 can insert connections to additional information about persons included in the generated visualizations. The presentation interface 128 can be used to provide the result set presentation and generated visualization back to the client device 180, the data exploration application 192, or the data service 194 for review and further interactions.

As illustrated, the analysis system 102 includes interface 104, at least one processor 106, the analysis manager 108, and memory 132. The interface 104 is used by the analysis system 102 for communicating with other systems in a distributed environment—including within the environment 100—connected to the network 160, e.g., one or more client devices 180, the data exploration application 192, data service(s) 194, and the source systems 162, 166, 170, among others, as well as other systems communicably coupled to the analysis system 102 and/or network 160. Generally, the interface 104 comprises logic encoded in software and/or hardware in a suitable combination and operable to communicate with the network 160 and other components. More specifically, the interface 104 may comprise software supporting one or more communication protocols associated with communications such that the network 160 and/or interface's hardware is operable to communicate physical signals within and outside of the illustrated environment 100. Still further, the interface 104 may allow the analysis system 102 to communicate with one or more client devices 180 and/or other systems regarding particular personnel and user information and demand fulfillment requests, as described in the present disclosure.

Network 160 facilitates wireless or wireline communications between the components of the environment 100 (e.g., between the analysis system 102 and the other illustrated systems, such as a particular client device 180), as well as with any other local or remote computer, such as additional mobile devices, client devices or clients (e.g., client device 180), servers, or other devices communicably coupled to network 160, including those not illustrated in FIG. 1. In the illustrated environment, the network 160 is depicted as a single network, but may be comprised of more than one network without departing from the scope of this disclosure, so long as at least a portion of the network 160 may facilitate communications between senders and recipients. In some instances, one or more of the illustrated components (e.g., the analysis system 102) may be included within network 160 as one or more cloud-based services or operations. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11a/b/g/n/ac, 802.20, WiMax, LTE, and/or any other appropriate wireless link. In other words, the network 160 encompasses any internal or external network, networks, sub-network, or combination thereof operable to facilitate communications between various computing components inside and outside the illustrated environment 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

The analysis system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the analysis system 102, in particular those related to the analysis manager 108. Specifically, the processor(s) 106 executes the algorithms and operations described in the illustrated figures, as well as the various software modules and functionality, including the functionality for sending communications to and receiving transmissions from client devices 180, as well as to other devices and systems. Each processor 106 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Memory 132 of the analysis system 102 may represent a single memory or multiple memories. The memory 132 may include any memory or database module and may take the form of volatile or non-volatile memory including, without limitation, magnetic media, optical media, random access memory (RAM), read-only memory (ROM), removable media, or any other suitable local or remote memory component. The memory 132 may store various objects or data (e.g., the data hub 134 and its staging area 136 and collected user data 140), the ML algorithm database 150, as well as others, etc.), including financial data, user information, administrative settings, password information, caches, applications, backup data, repositories storing business and/or dynamic information, and any other appropriate information associated with the analysis system 102 including any parameters, variables, algorithms, instructions, rules, constraints, or references thereto. Additionally, the memory 132 may store any other appropriate data, such as VPN applications, firmware logs and policies, firewall policies, a security or access log, print or other reporting files, as well as others. While illustrated within the analysis system 102, memory 132, or a portion thereof, may be located remote from the analysis system 102 in some instances, including as a cloud application or repository, or as a separate cloud application or repository when the analysis system 102 itself is a cloud-based system.

As illustrated and described, one or more client devices 180 may be present in the example system 100. Each client device 180 may be associated with requests transmitted to the analysis system 102 submitted via the client application or query interface 186 that executes on or at the client 180 for demand fulfillment analyses. In some instances, the query interface 186 may be associated with a digital assistant executing at the client device 180, or a digital assistant remotely accessed via operation of the client application 186. The input provided via the client application or query interface 186 may be a query explicitly identifying a request for a demand fulfillment analysis, such as a request for team members related to a particular topic or project. In other instances, at least some of the query may be implicitly determined based on the particular user associated with the client device 180 or client application 186, where the role or perspective of that user is used in conjunction with the explicitly identified query to determine a query to be provided to the analysis system 102 and its query analyzer 116.

As illustrated, the client device 180 may include an interface 182 for communication (similar to or different from interface 104), at least one processor 184 (similar to or different from processor 106), the client application 186, memory 190 (similar to or different from memory 132), and a graphical user interface (GUI) 188.

The illustrated client device 180 is intended to encompass any computing device such as a desktop computer, laptop/notebook computer, mobile device, smartphone, personal data assistant (PDA), tablet computing device, one or more processors within these devices, or any other suitable processing device. In general, the client device 180 and its components may be adapted to execute any operating system, including Linux, UNIX, Windows, Mac OS®, Java™, Android™, or iOS. In some instances, the client device 180 may comprise a computer that includes an input device, such as a keypad, touch screen, or other device(s) that can interact with the client application or query interface 186, and an output device that conveys information associated with the operation of the applications and their application windows to the user of the client device 180. Such information may include digital data, visual information, or a GUI 188, as shown with respect to the client device 180. Specifically, the client device 180 may be any computing device operable to communicate queries or communications to the analysis system 102, other client devices 180, and/or other components via network 160, as well as with the network 160 itself, using a wireline or wireless connection. In general, client device 180 comprises an electronic computer device operable to receive, transmit, process, and store any appropriate data associated with the environment 100 of FIG. 1.

Client application 186 may be any suitable application, program, mobile app, or other component. As illustrated, the client application 186 interacts with the analysis system 102 to submit queries for the demand fulfillment analysis operations and can present information and visualizations output by the analysis system 102, communicating via network 160 and its interface 182 with the corresponding connections and components of the analysis system 102. In some instances, the client application 186 may be a browser, where the functionality of the client application 186 may be realized using a web application or website the user can interact with the analysis system 102 via the client application 186. In other instances, the client application 186 may be a remote agent, component, or client-side version of the analysis system 102 and the analysis manager 108. In some instances, the client application 186 may interact directly with the analysis system 102, another client-side component, or at the analysis system 102.

GUI 188 of the client device 180 interfaces with at least a portion of the environment 100 for any suitable purpose, including generating a visual representation of the client application 186 and/or the content associated with the client application 186, including for submitting queries and presenting result sets. In particular, the GUI 188 may be used to present screens or UIs associated with the client application 186. In some instances, those screens or UIs may include buttons or other interactive elements allowing users to submit a demand fulfillment query. GUI 188 may also be used to view and interact with various Web pages, applications, and Web services located local or external to the client device 180. Generally, the GUI 188 provides the user with an efficient and user-friendly presentation of data provided by or communicated within the system. The GUI 188 may comprise a plurality of customizable frames or views having interactive fields, pull-down lists, and buttons operated by the user. For example, the GUI 188 may provide interactive elements that allow a user to view or interact with information related to the operations of processes associated with the analysis system 102, including the presentation of a generated visualization of a result set, which can then be interacted with to obtain additional information about particular persons and personnel included in the result visualization. In general, the GUI 188 is often configurable, supports a combination of tables and graphs (bar, line, pie, status dials, etc.), and is able to build real-time portals, application windows, and presentations. Therefore, the GUI 188 contemplates any suitable graphical user interface, such as a combination of a generic web browser, a web-enable application, intelligent engine, and command line interface (CLI) that processes information in the platform and efficiently presents the results to the user visually.

As illustrated and previously described, the illustrated environment 100 may be associated with a plurality of data source systems 162, 166, 170. While three systems are illustrated FIG. 1, fewer or additional systems may be included in particular implementations. In particular, some implementations may include many additional source systems from both internal and external systems. Example internal systems from where data may be collected include human resource management (HRM) solutions, production planning systems, project systems, sales and distribution systems, accounting systems, organizational management systems, professional development systems, and others. Similar systems from outside an enterprise may also be accessible and used to collect person details (e.g., person details 164, 168, and 172) about potential persons to be considered in the collected user data 140. Other external systems may also include social networks, wikis, production notes, and others available systems, as well as contract databases and potential employee databases. By collecting the information and identifying and classifying the particular persons on which information is received, the analysis system 102 can provide an updated list of persons, including their current employment and contract status, project assignments and availability, expertise, and other related information.

The data exploration application 192 comprises an application through which users can explore the various collected user data 140, including outside of the client application 186 and its operations. The data exploration application 192 may be, in some instances, an add-on or additional set of functionality used with the client application 186, while in others, the data exploration application 192 may be able to consume the information and query a result set in additional and/or alternative ways than the client application 186 makes possible.

Data service 194 can be used to provide outputs from particular queries to various applications, including those through which one or more queries were submitted. The data service 194 may present information in a manner similar to client application 186, while in other instances, the result set of the analysis system 102 may provide a structured set of data that can be ingested by one or more other applications or systems.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
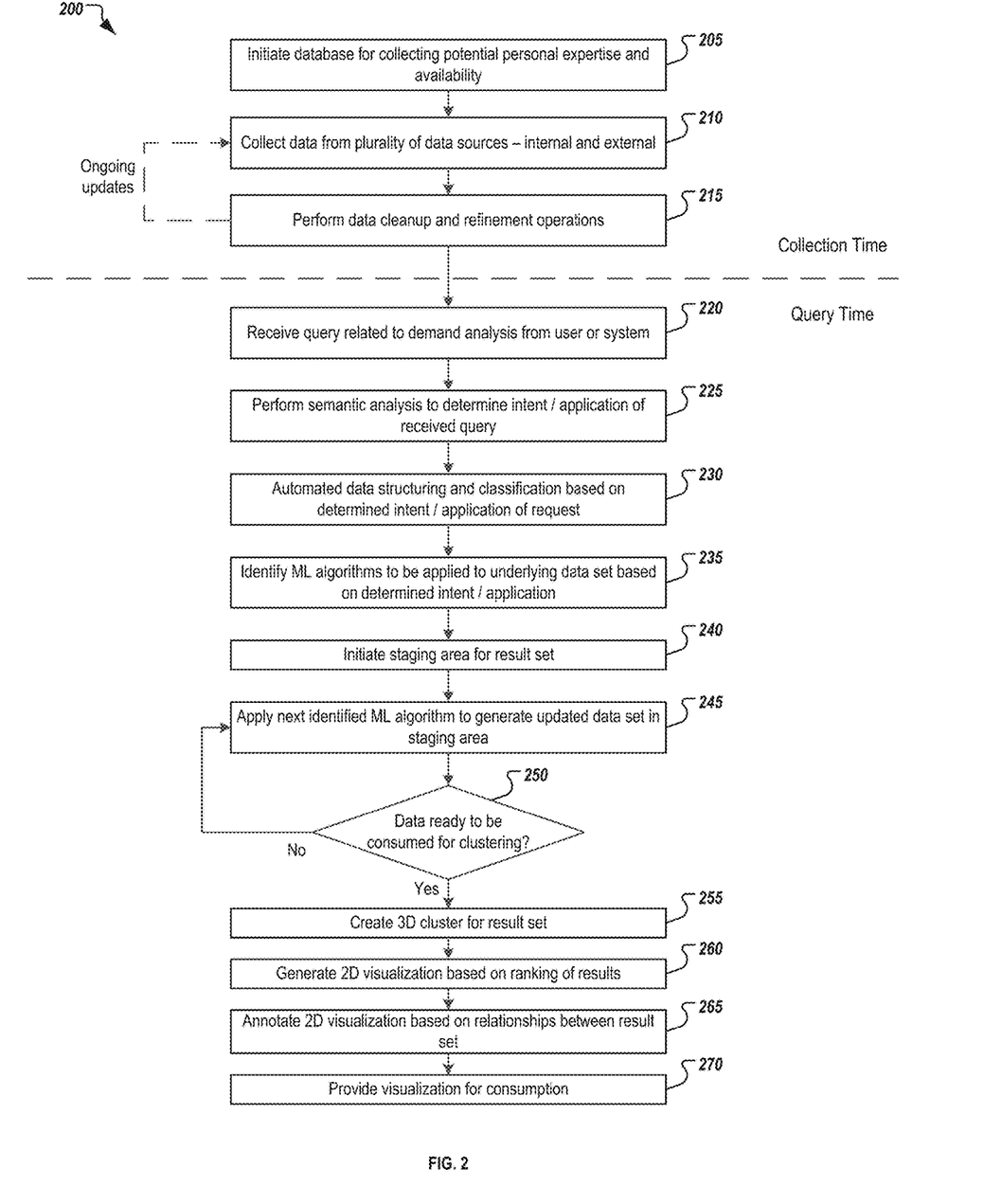
FIG. 2 represents an example flow for performing a demand fulfillment analysis, including a data collection and query analysis.

FIG. 2 represents an example flow for performing a demand fulfillment analysis, including data collection and query analysis. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, a database for collecting information on particular personnel and persons related to those persons' expertise, availability, and other information is initiated. In some instances, the particular fields in the database can match one or more of a plurality of fields available from various data sources associated with ingesting and managing personnel information.

At 210, data is collected from those plurality of internal and external data sources to an enterprise. Any number of relevant internal systems and databases can be used to populate the database, while one or more external systems can also be used to populate additional information. In some instances, the systems may include information on current employees, current and prospective contract workers (e.g., consultants, part-time workers, etc.), and experts external to the enterprise. Information about those persons can be collected that identifies information regarding particular project involvement, technical backgrounds, publications, current and past project teams and subject matter, and availability information (e.g., whether the person is currently employed, active in one or more projects, and/or awaiting assignments, etc.). By collecting this information in a centralized or connected location, further analysis can be performed in order to ensure that the responsive result set represents a detailed analysis of potential persons best meeting the requirements and needs of the requesting user or system.

At 215, data clean up and refinement operations are performed. As duplicative personal data may be received from different sources, deduplication efforts and operations can be performed. Additionally, some information received from some sources may be formatted in a first format, where data collected and ingested should be in a second format. For that data, clean up and refinement operations may include reformatting or translating the received data into a predetermined or common format for storage. In some instances, data clean up and refinement may include determining existing records associated with a person, and adding newly received data into that existing record. Alternatively, additional linking fields or entries, such as a common identifier, may be added to the received data, where those additional fields or entries can be used for associating the newly received data for a person with existing data already associated with the same person.

The operations of 210 can be repeated over time as additional data is received from the one or more source systems. As new data is received, additional cleanup and refinement may be required. Additional data may be collected at any time, both before and after queries have been received. As such, collection time and query time may overlap or occur concurrently in some instances.

At 220, a query related to a demand analysis is received, either from a particular user or application. The query may be structured according to a particular syntax or completed, in part, using a form or other query assistance. In other instances, the query may be received in a natural language format such that additional processing may be required to determine an intent and meaning of the query. In some instances, queries may be received from a digital assistant or other tool, or may be received via a suitable user interface associated with a call or submission to a query analysis system.

At 225, a semantic analysis is performed to determine an intent or application of the received query. In some instances, such as where the query input tool identifies a purpose of the query (e.g., via a dedicated field), the semantic analysis may be associated with the explicit identification in the query. In instances where a natural language query or other unstructured or non-explicit query is provided, the semantic analysis may be performed by a natural language processor, and can be evaluated to determine a particular semantic intent and/or use case or application with which the query corresponds.

At 230, an automated data structuring and classification process may be performed based on the determined intent and/or use case of the request. As the purpose of a particular request may determine how the data is to be analyzed or what data is initially relevant, this operation may include removing some data from the underlying data set before continuing with method 200. For example, if the query related to an escalation process for an issue that is urgent, an initial operation could, at 230, remove persons from consideration who are not within a local area to the requesting user, or within the same or one time zone difference from the requester. Alternatively, for particular queries to be analyzed, a particular format or structure to a data set to be analyzed may be necessary or preferred. At 230, the structuring and/or classification operations can be performed specific to the determined intent and/or use case. In some instances, no initial structuring or classification may be performed at 230.

At 235, a set of machine learning algorithms to be applied to the underlying data set (or the data set as modified or updated in 230) are identified based on a link or relationship to the determined semantic intent and/or use case of the request. The machine learning algorithms may have been previously trained and updated over time using any suitable technique, and may represent different weightings, manipulations, and modifications to the underlying data set. Additionally, multiple machine learning algorithms may be applied to the data set in a particular defined order, such that identifying the set of machine learning algorithms includes identifying a plurality of machine learning algorithms to be applied and the particular order in which those algorithms are to be applied. In some instances, the sequential order of application of the algorithms may result in a different result set than an alternative order may have caused, while in other instances, the order of application may not have an effect on the end results. The order of application, as well as the grouping of algorithms, may be determined using additional learning mechanisms, and may be updated over time. Both the particular algorithms and the order of those algorithms may be linked to the semantic intent and/or use case, and can be stored and available to the query analysis.

At 240, a staging area is initiated or initialized for the result set to be generated. The staging area can be used to safely apply various algorithms and modifications to the underlying data set without modifying the stored data. In some instances, each query may be associated with its own staging area to ensure that the modifications specific to the query are applied without being affected by operations performed related to other queries.

At 245, a first (or next) identified machine learning algorithm from the identified set of machine learning algorithms is applied to generate an updated data set in the staging area. For the first machine learning algorithm applied, the data set acted upon will be the underlying data set. If any initial modifications to the data set were performed at 230, then that modified data set will be acted upon. Applying the machine learning algorithms to the data set can cause the data set to updated, rearranged, and/or evaluated based on one or more criteria and/or formula.

At 250, a determination is made as to whether the updated data set is ready to be consumed for clustering and further analysis. The determination may be based on whether additional machine learning algorithms from the identified set of algorithms are to be applied. Alternatively, the determination may be whether a particular size or set of persons from the original data set are identified or have differentiated from the norm as to be a sufficient result set. Other determinations may also be performed or used based on the current updated data set. If the data is not ready, method 200 returns to 245, where the next algorithm in the set of identified algorithms is applied to generate a further updated data set in the staging area, and the determination of 250 can be made again. If, however, it is determined that the data is ready to be consumed, method 200 continues at 255.

At 255, in some instances, a three-dimensional (3D) cluster for the result set can be created. The 3D cluster can be generated using any suitable methodology or procedure. The 3D cluster may represent a 3D result set, such as by using a T-sne algorithm. The mapping of the 3D cluster can be used to project the results of applying the various machine learning algorithms into a 3-dimensional (or n-dimensional, in some case) space, where a distance from a desired or request set of information associated with the query is represented in a particular location within the 3D cluster. Those results that provide a better match may be relatively closer within the 3D cluster, and can be used to identify the better options after the analysis is completed.

Figure 5:
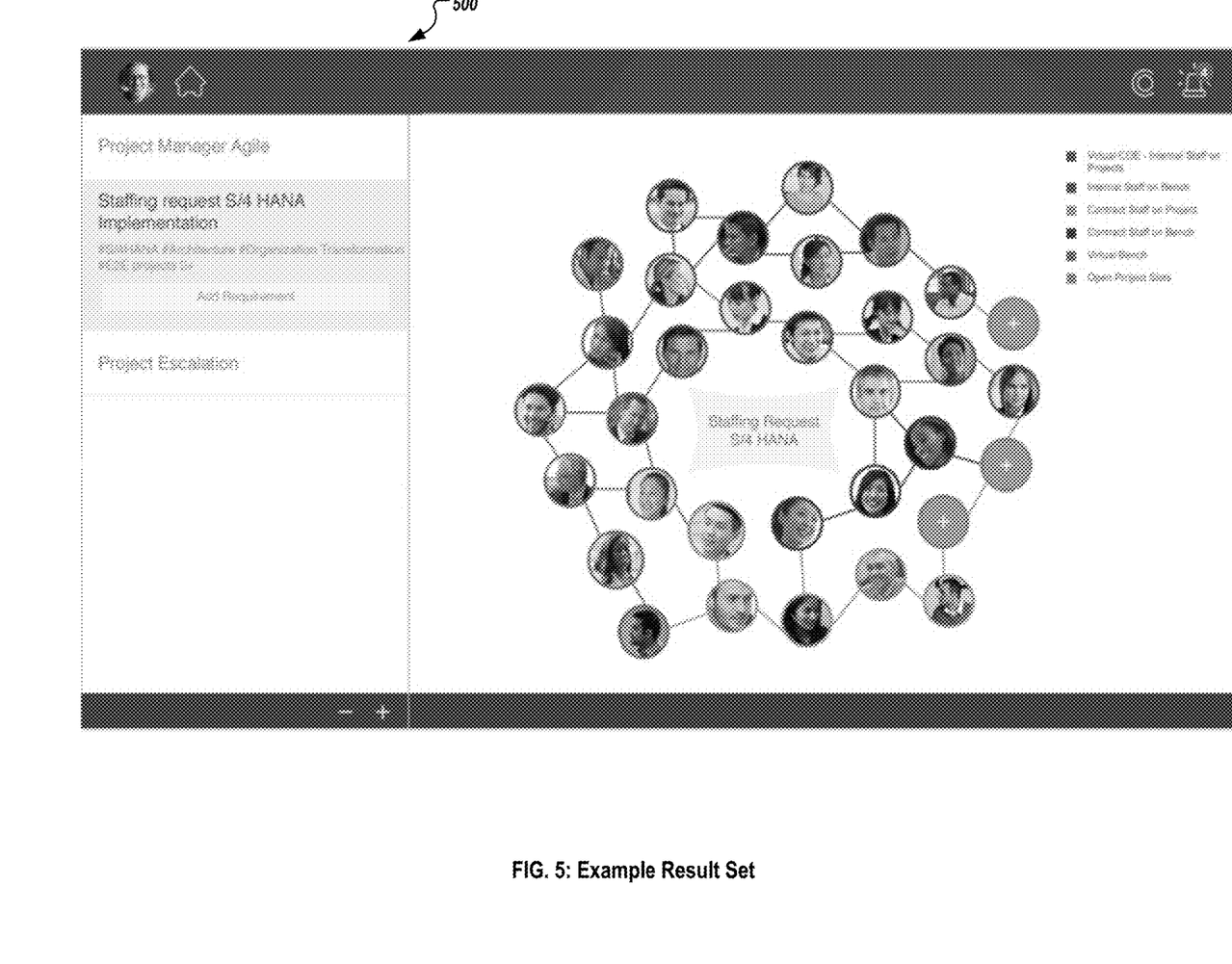
FIGS. 5 and 6 illustrate example result sets and two-dimensional (2D) visualizations, as well as interactions with the visualization, in response to a particular query.
Figure 6:
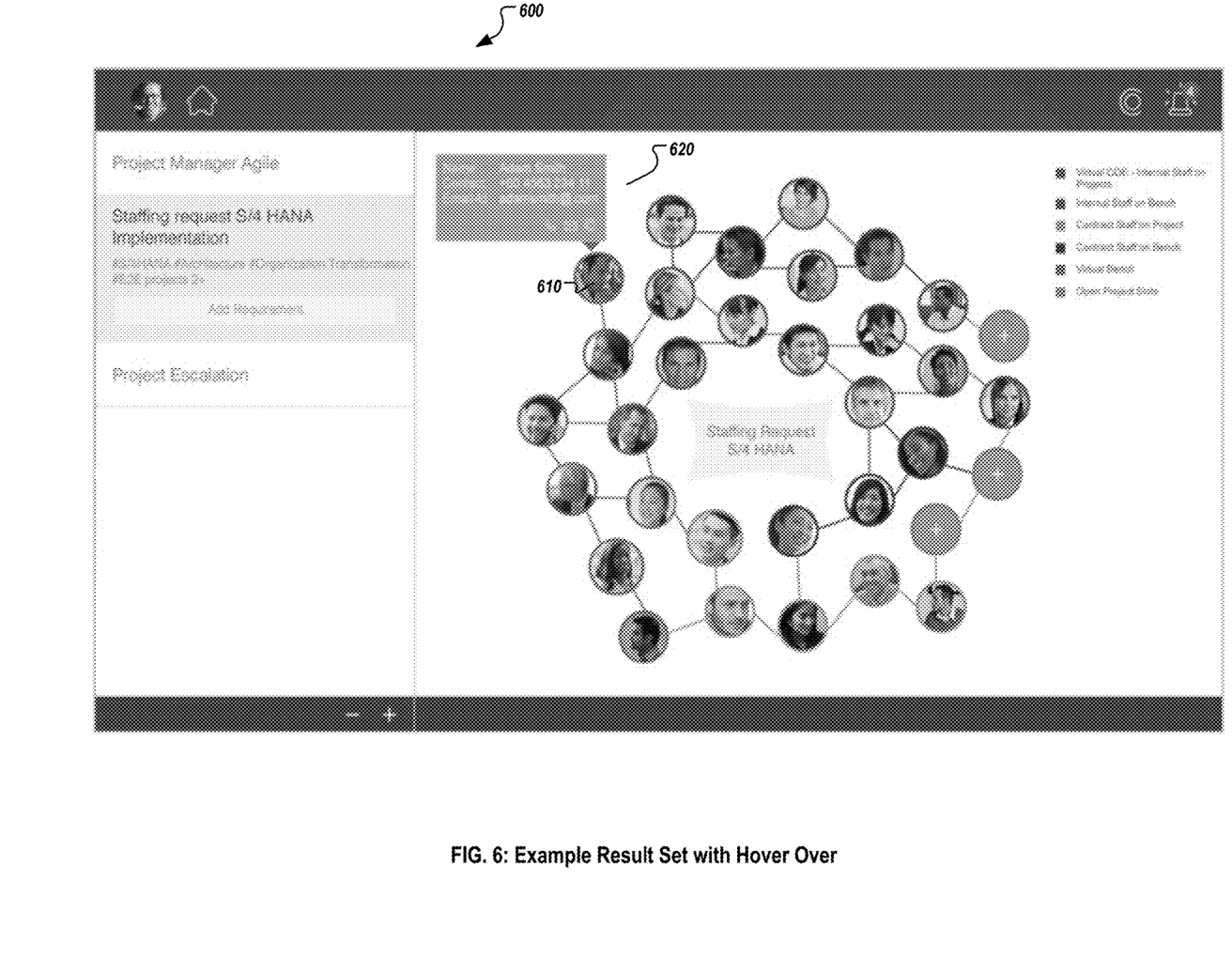

At 260, a 2D visualization can be generated based on the 3D cluster and a relative ranking of the result set. Examples of the 2D visualization can be found, for instance, in FIGS. 4-6. As illustrated in FIGS. 5 and 6, further annotations can be added, in some instances, to the 2D visualization at 265. Any type of suitable annotation can be applied or used. In some instances, color-coded annotations can be added to identify a type of person (e.g., internal staff/employee, contract staff, external experts), as well as additional relationship information. For example, annotation information can specifically identify relationships between particular members of a result set. Example annotations as derived from the collected data can include, but are not limited to, an identification of a prior or current working relationship, a current adversarial relationship, a type of relevant role associated with a person in the results (e.g., an external trainer, a manager in a particular group, a member of a particular social network), and others. In some instances, the annotations may be visible immediately in the 2D visualization, while in others, an additional action (e.g., a mouse-click or hover over action, etc.) may be required to illustrate the additional annotation. In some instances, a combination of visible and non-visible (i.e., where additional action is required) annotations may be added to a 2D visualization. At 270, the generated visualization can be provided to a client application, exploration application, data service, or other system or application for consumption and interaction. In some instances, additional information about one or more of the result sets can be linked to one or more of the source systems, such that additional information about that particular person can be accessed and reviewed as further actions are taken based on the result.

Figure 3:
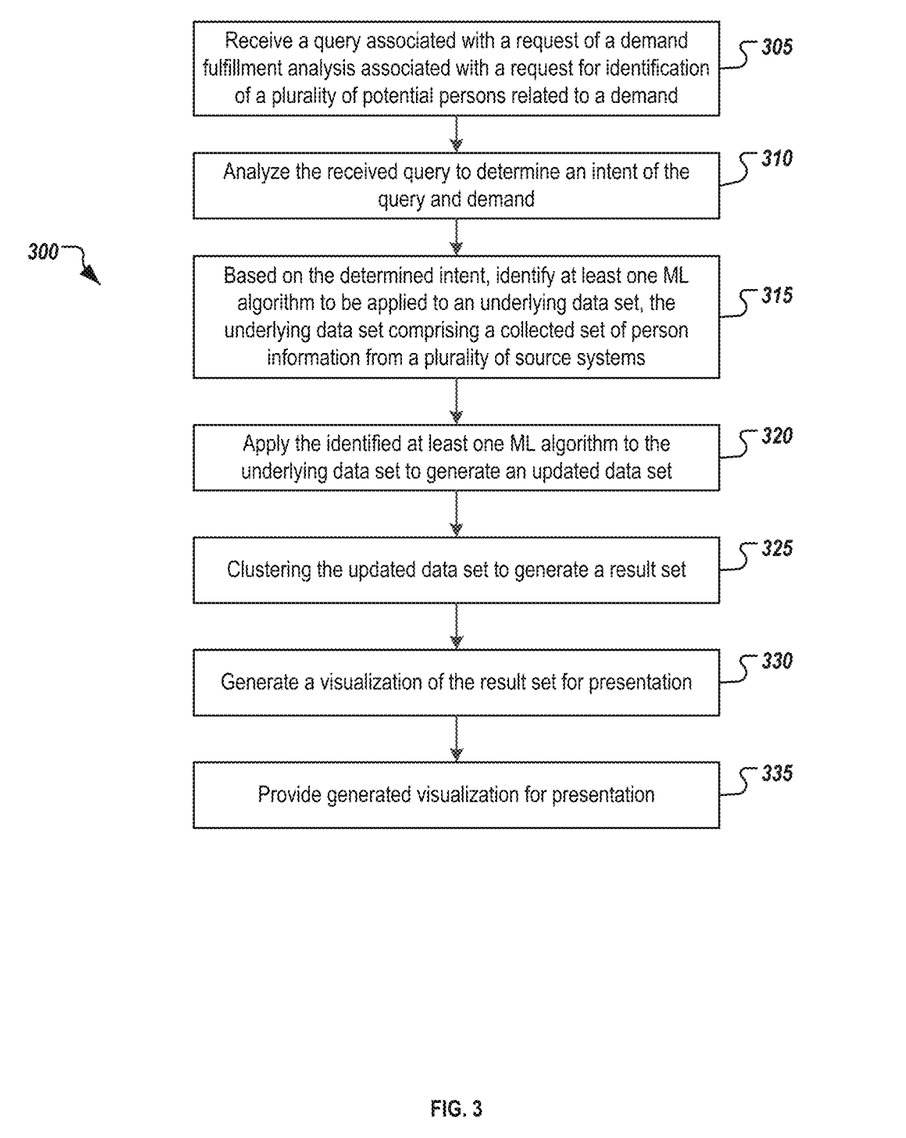
FIG. 3 represents an alternative example flow for performing a demand fulfillment analysis after receiving a query from a user or application.

FIG. 3 represents an alternative example flow for performing a demand fulfillment analysis after receiving a query from a user or application. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a query associated with a request for a demand fulfilment analysis associated with an identification of persons related to the demand is received. In some instances, the query may be received via a client application, conversational UI, web application, or any other suitable input. The query may represent a structured question specific to a particular type of analysis, or an unstructured question which may need to be further interpreted to determine the particular use case or intent of the query.

At 310, the received query is analyzed to determine its intent and the purpose of the demand. In some instances, a semantic analysis may be performed to determine the meaning of the demand, such as by passing or providing the received query to a semantic analysis or natural language processor.

At 315, based on the determined intent, at least one machine learning algorithm to be applied to an underlying data set can be identified. The underlying data set may comprise a collected set of data from a plurality of source systems, where those source systems store and make available data about one or more potential team members or persons who can be associated with a particular team or demand. As described previously, those source systems may be either internal to an enterprise associated with the query, or external thereto. For example, information about particular employees may be obtained from one internal source system, and current staffing information may be obtained from a project management system. Similarly, contract workers who are under contract and are either available or currently assigned to a product can be captured from a team management application. Still further, information on potential new hires and external experts can be collected from third-party sources, including professional social networks. Using that information and an identification of particular user's availability, an underlying data set can be generated, and maintained over time with modifications based on ongoing changes to those data sources.

Regarding the identification of the at least one algorithms, an algorithm repository and/or rule set may be used to determine which algorithms correspond to particular intents, use cases, or demand types. Once the intent or use case of a particular query is identified, a set of one or more algorithms can be identified to be applied to the underlying data set to obtain a result set in response. In some instances, not only does a particular intent or use case correspond to a set of algorithms, but a specific order of application of those algorithms may also be identified. The order of application and the particular algorithms to be used may be determined manually by experts or administrators, or may be learned over time by a suitable machine learning or artificial intelligence system.

At 320, the at least one identified machine learning algorithm is applied to the underlying data set to generate an updated data set. The application of the algorithms can be performed in a data staging area, allowing the operations to be performed without modifying or changing the underlying data set. As the algorithms are applied, each application may modify the updated data set before a next algorithm is applied. If the set of algorithms to be applied are to be applied in a particular order, that order can be observed to ensure that an expected result is to be provided.

At 325, the updated data set can be clustered, or have a clustering algorithm applied to it, to generate a result set. In some instances, applying the clustering algorithm, which can include any suitable clustering algorithm, can create a 3D cloud or filtered cloud of the persons under consideration with the application of the identified algorithms.

At 330, a visualization of the result set can be generated for presentation. In some instances, the visualization may be a 2D illustration of the results as adapted from the 3D cloud created by the clustering process. The visualization can be used to identify points closest to the subject of the demand within the 3D or filtered cloud. Alternatively, a ranking algorithm can be applied to determine the best persons corresponding to the particular demand. In some instances, the visualization can be enhanced with additional annotations used to better describe the result set and/or provide additional visual information to users and systems interacting with the visualized result set. For example, color-coding can be applied to the particular visualization in order to easily identify results as persons who are employees, contractors, or external experts or candidates. Additionally, annotations can be provided to illustrate which of those results are immediately available to fulfill a particular demand (e.g., are not fully staffed on other projects), as well as those immediately unavailable based on their current staffing. In some instances, the annotations can be used to identify particular relationships between two or more of the persons returned, as well as particular roles or positions of particular returned persons. In some instances, implementations may allow additional information to be embedded or associated with particular persons in the result set. In such instances, that additional information may be available or presented in response to an interaction event, such as a hover over event, a tap-based action, or any other suitable interaction.

At 335, the generated visualization can be provided for presentation. The visualization can be provided to a requesting user or application via a graphical user interface. In other instances, the result set can be stored and made available to one or more other applications, such as a data exploration application, as well as to one or more data services used to provide the visualization and/or the result set for further manipulation and usage across additional applications.

Figure 4:
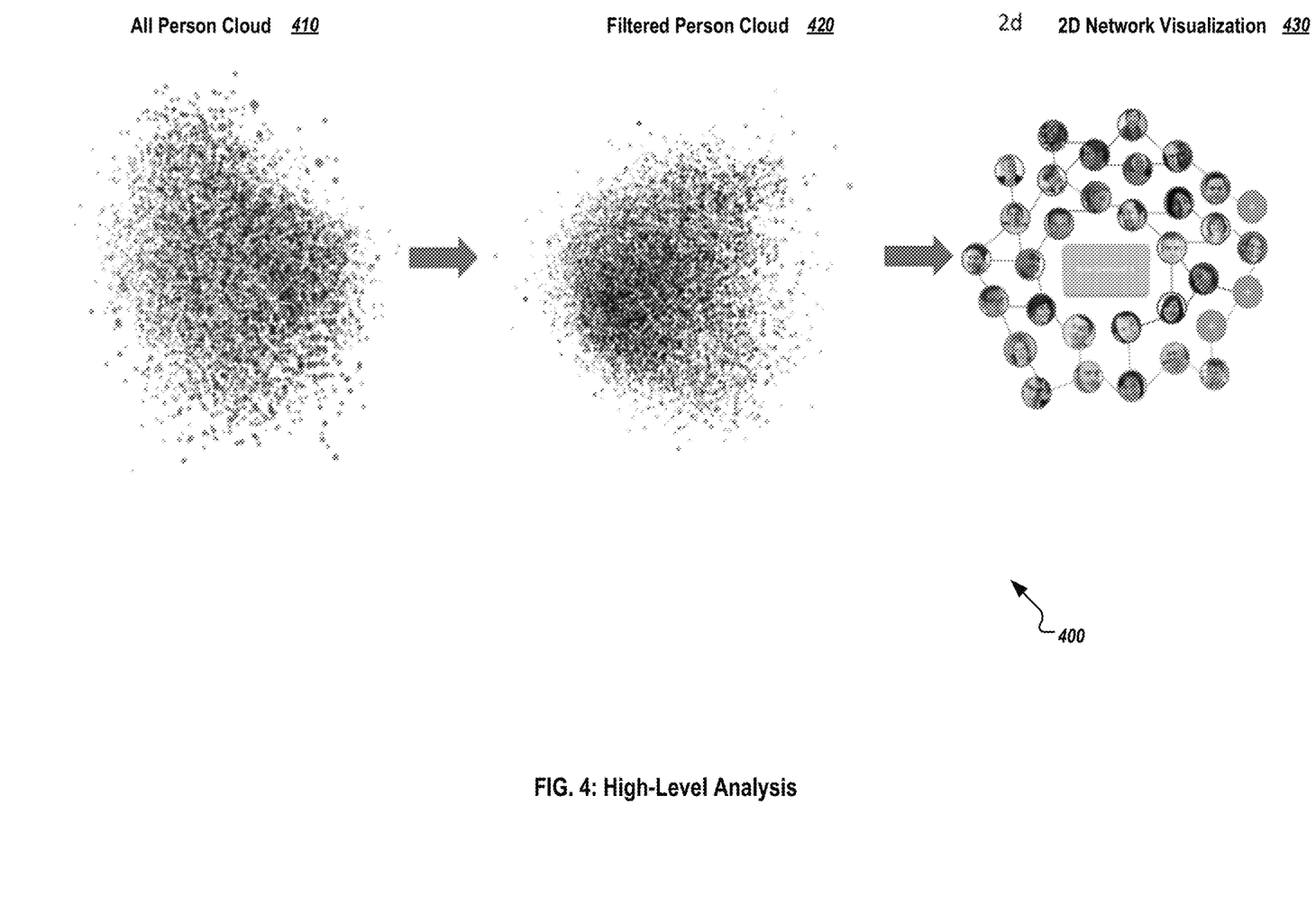
FIG. 4 illustrate an example of an evolution from a general data set to a particular visualization.

FIG. 4 illustrates an example of an evolution from a general data set to a particular visualization as described herein. Initially, the data set may be represented as an all person cloud 410, which may be represented as a 3D cloud of persons about which information has been collected by the data collection operations. In response to a particular query and the application of one or more filtering algorithms corresponding to the intent or use case of the query, along with any particular query parameters, a filtered person cloud 420 can be obtained. The filtered person cloud 420 can remove one or more persons who do not fit a particular demand request, and/or can move entries representing persons within the cloud 420 based on their relative fit for the particular demand associated with the query. If a series of machine learning algorithms are applied, then multiple versions of the filtered person cloud 420 can be obtained as additional algorithms are applied. Once a final result set is obtained, the filtered person cloud 420 can be translated in a 2D visualization 430 illustrated a set of persons meeting the submitted demand. As illustrated, a plurality of connections and annotations have been added to the 2D visualization 430 to provide context to the persons identified, as well as relative information associated with each of those results. As illustrated, a number of color-coded annotations can be added to the illustration. For example, persons who are employees and are currently assigned to a project may be represented in green. Internal employees who are available, or not fully staffed on projects currently, may be represented in purple. Contract staff currently staffed on a project can be illustrated as orange, while contract staff with availability can be illustrated in red. External persons making up a virtual bench from external data sources can be identified in blue. In some instances, additional or alternative indicators can be used, including to present particular additional details or information about different persons, as well as those persons relationship to one another or the particular demand topic.

FIG. 5 illustrates an example result set and 2D visualization in response to a particular query. For example, the query associated with the result set relates to staffing requests for a particular S/4 HANA implementation. Based on an analysis of internal employees, identified contract staff, and external persons included in a virtual bench, the generated visualization can be presented. In some instances, additional requirements or refinements can be added to the query, and a revised result set can be generated and visualized.

As shown in FIG. 6, a particular person in the result set can be interacted with in order to obtain additional information. For example, when the representation for person 610 is interacted with (e.g., a hover over, a click, a tap, etc.), additional person-specific information 620 can be obtained and presented with the visualization. In some instances, the information may be embedded in or associated with the visualization. In other instances, a link to at least one of the source systems can be included or dynamically executed in response to the interaction, such that the additional information 620 can be accessed from the source and presented in real-time within the visualization. In some instances, additional or alternative interactions with either the additional information 620 or the person 610 can result in opening or interacting with an application or program related to the source system, or a further data exploration application that can be used to further investigate the person.

The included figures and accompanying description illustrate example processes and computer-implementable techniques. But the system (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by at least one processor, the method comprising:
   receiving a query associated with a request of a demand fulfillment analysis associated with an identification of a plurality of potential persons related to a demand;
   analyzing the received query to determine an intent of the demand;
   based on the determined intent of the demand, identifying at least one algorithm to be applied to an underlying data set, the underlying data set comprising a collected set of information from a plurality of source systems, the collected set of information identifying employment-related details associated with a plurality of persons;
   applying the at least one identified algorithm to the underlying data set based on a set of parameters associated with the received query to generate an updated data set from the underlying data set;
   clustering the updated data set to generate a result set from the underlying data set;
   generating a visualization of the result set for presentation; and
   providing the generated visualization for presentation.

2. The method of claim 1, wherein the plurality of source systems include at least one system internal to an enterprise providing the demand fulfillment analysis, and at least one system external to the enterprise providing the demand fulfillment analysis.

3. The method of claim 2, wherein the at least one system internal to the enterprise providing the demand fulfillment analysis includes at least one of an employee management system, an internal project systems, a human resource application, an internal publishing system, or a contractor management systems.

4. The method of claim 2, wherein the at least one system external to the enterprise providing the demand fulfillment analysis includes at least one of a professional networking site, an external publishing database, or a third-party job application site.

5. The method of claim 1, wherein the received query comprises a natural language query, and wherein analyzing the received query to determine the intent of the demand comprises performing a semantic analysis of the natural language query to determine the intent of the demand.

6. The method of claim 5, wherein identifying the at least one algorithm to be applied to an underlying data set comprises matching the determined intent of the demand to a predefined set of algorithms to be applied to the underlying data set, wherein predefined sets of algorithms are associated with particular intents of received queries.

7. The method of claim 6, wherein the predefined set of algorithms comprises two or more algorithms to be applied to the underlying data set based on the received query, wherein the two or more algorithms to be applied are associated with a particular order of application of the algorithms.

8. The method of claim 1, wherein applying the at least one identified algorithm to the underlying data set based on a set of parameters associated with the received query to generate an updated data set from the underlying data set comprises:
   applying the at least one identified algorithm to a copy of the underlying data set at a data staging area, wherein applying the at least one identified algorithm to the underlying data set does not modify the underlying data set.

9. The method of claim 1, wherein clustering the updated data set to generate a result set from the underlying data set comprises generating a three-dimensional cloud of persons from the underlying data set, the cloud of persons organized based on their relationship to the received query.

10. The method of claim 9, wherein generating a visualization of the result set for presentation comprises generating, from the three-dimensional cloud of persons, a two-dimensional visualization of the three-dimensional cloud of persons.

11. The method of claim 10, wherein generating, from the three-dimensional cloud of persons, the two-dimensional visualization of the three-dimensional cloud of persons comprises:
   identifying at least one relationship between persons included in the two-dimensional visualization; and
   annotating the two-dimensional visualization with at least one of the identified relationships between persons included in the two-dimensional visualization.

12. The method of claim 10, wherein generating, from the three-dimensional cloud of persons, the two-dimensional visualization of the three-dimensional cloud of persons comprises:
   identifying information associated with particular persons included in the two-dimensional visualization related to at least one of their respective role or availability; and annotating the two-dimensional visualization with at least a portion of the identified information for at least one of the particular persons in the two-dimensional visualization.

13. The method of claim 12, wherein annotating the two-dimensional visualization with at least a portion of the identified information for at least one of the particular persons in the two-dimensional visualization comprises adding an interactive link to an illustration associated with a particular person, where the interactive link provides a link to information associated with the particular person in at least one source system from which data was collected for the particular person.

14. A system comprising:
at least one processor; and
a memory communicatively coupled to the at least one processor, the memory storing instructions which, when executed, cause the at least one processor to perform operations comprising:
receiving a query associated with a request of a demand fulfillment analysis associated with an identification of a plurality of potential persons related to a demand;
analyzing the received query to determine an intent of the demand;
based on the determined intent of the demand, identifying at least one algorithm to be applied to an underlying data set, the underlying data set comprising a collected set of information from a plurality of source systems, the collected set of information identifying employment-related details associated with a plurality of persons;
applying the at least one identified algorithm to the underlying data set based on a set of parameters associated with the received query to generate an updated data set from the underlying data set;
clustering the updated data set to generate a result set from the underlying data set;
generating a visualization of the result set for presentation; and
providing the generated visualization for presentation.

15. The system of claim 14, wherein the plurality of source systems include at least one system internal to an enterprise providing the demand fulfillment analysis, and at least one system external to the enterprise providing the demand fulfillment analysis, wherein the at least one system internal to the enterprise providing the demand fulfillment analysis includes at least one of an employee management system, an internal project systems, a human resource application, an internal publishing system, or a contractor management systems, and wherein the at least one system external to the enterprise providing the demand fulfillment analysis includes at least one of a professional networking site, an external publishing database, or a third-party job application site.

16. The system of claim 14, wherein the received query comprises a natural language query, and wherein analyzing the received query to determine the intent of the demand comprises performing a semantic analysis of the natural language query to determine the intent of the demand, and wherein identifying the at least one algorithm to be applied to an underlying data set comprises matching the determined intent of the demand to a predefined set of algorithms to be applied to the underlying data set, wherein predefined sets of algorithms are associated with particular intents of received queries.

17. The system method of claim 16, wherein the predefined set of algorithms comprises two or more algorithms to be applied to the underlying data set based on the received query, wherein the two or more algorithms to be applied are associated with a particular order of application of the algorithms.

18. The system of claim 14, wherein applying the at least one identified algorithm to the underlying data set based on a set of parameters associated with the received query to generate an updated data set from the underlying data set comprises:
applying the at least one identified algorithm to a copy of the underlying data set at a data staging area, wherein applying the at least one identified algorithm to the underlying data set does not modify the underlying data set.

19. A non-transitory computer-readable medium storing instructions which, when executed, cause at least one processor to perform operations comprising:
receiving a query associated with a request of a demand fulfillment analysis associated with an identification of a plurality of potential persons related to a demand;
analyzing the received query to determine an intent of the demand;
based on the determined intent of the demand, identifying at least one algorithm to be applied to an underlying data set, the underlying data set comprising a collected set of information from a plurality of source systems, the collected set of information identifying employment-related details associated with a plurality of persons;
applying the at least one identified algorithm to the underlying data set based on a set of parameters associated with the received query to generate an updated data set from the underlying data set;
clustering the updated data set to generate a result set from the underlying data set;
generating a visualization of the result set for presentation; and
providing the generated visualization for presentation.

20. The medium of claim 19, wherein the plurality of source systems include at least one system internal to an enterprise providing the demand fulfillment analysis, and at least one system external to the enterprise providing the demand fulfillment analysis, wherein the at least one system internal to the enterprise providing the demand fulfillment analysis includes at least one of an employee management system, an internal project systems, a human resource application, an internal publishing system, or a contractor management systems, and wherein the at least one system external to the enterprise providing the demand fulfillment analysis includes at least one of a professional networking site, an external publishing database, or a third-party job application site.

* * * * *